US008494708B2

(12) United States Patent
Bechtler et al.

(10) Patent No.: US 8,494,708 B2
(45) Date of Patent: Jul. 23, 2013

(54) GOOD CHECKING FOR VEHICLE YAW RATE SENSOR

(75) Inventors: Henrik Bechtler, Stuttgart (DE); Ravi Bhadange, Farmington, MI (US); Nachiket Patil, Farmington Hills, MI (US); Takeshi Tokonaga, Yokohama (JP); Stefan Mallmann, Lauffen (DE); Michael Schwab, Korntal (DE); Dietmar Stapel, Sendenhorst (DE); Willy Klier, Bloomfield Hills, MI (US); Joerg Eesmann, Rheine (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 12/860,418

(22) Filed: Aug. 20, 2010

(65) Prior Publication Data
US 2011/0066321 A1 Mar. 17, 2011

Related U.S. Application Data

(60) Provisional application No. 61/236,412, filed on Aug. 24, 2009.

(51) Int. Cl.
*G01P 21/00* (2006.01)
*G01M 17/00* (2006.01)
*G06F 7/00* (2006.01)
*G06F 11/30* (2006.01)
*G06F 19/00* (2011.01)
*G07C 5/00* (2006.01)

(52) U.S. Cl.
USPC ........ 701/30.3; 701/29.7; 701/30.1; 701/30.2; 701/30.4; 701/31.1; 701/33.4; 701/33.5; 701/33.6; 701/33.7; 701/34.4; 701/29.1; 701/29.2; 73/1.37

(58) Field of Classification Search
USPC ................ 73/1.37; 701/29.7–31.7, 33.4–34.4
See application file for complete search history.

(56) References Cited

U.S. PATENT DOCUMENTS

| 3,798,596 | A | 3/1974 | Sumiyoshi et al. |
| 3,803,425 | A | 4/1974 | Carp |
| 3,916,375 | A | 10/1975 | Sumiyoshi et al. |

(Continued)

FOREIGN PATENT DOCUMENTS

| DE | 10333323 | 1/2004 |
| EP | 1227019 | 7/2002 |

OTHER PUBLICATIONS

Harland, David M., Lorenz, Ralph D., "Space Systems Failures", Springer Praxis Books, 2005, Part Two, 211-226, available at http://www.springerlink.com/content/n886138036412186/.*
EP10173774 European Search Report dated Nov. 30, 2010, 5 pages.

(Continued)

*Primary Examiner* — Ryan Zeender
*Assistant Examiner* — Allen Chein
(74) *Attorney, Agent, or Firm* — Michael Best & Friedrich LLP

(57) ABSTRACT

A controller for determining whether a previously-detected vehicle malfunction still exists. If the malfunction is no longer detected in the sensor signals, a vehicle control system operates in a first operational state or normal operational state with respect to the previously-malfunctioning sensor (e.g., signals from the sensor are used to control the vehicle). If the malfunction continues to be detected, the vehicle control system operates in a second operational state or malfunction state with respect to the malfunctioning sensor in which the signals from the sensor are not used to control the vehicle.

20 Claims, 11 Drawing Sheets

U.S. PATENT DOCUMENTS

| | | | |
|---|---|---|---|
| 4,219,244 A | 8/1980 | Griner et al. | |
| 4,233,599 A | 11/1980 | Brearley | |
| 4,234,866 A | 11/1980 | Kuroda et al. | |
| 4,379,520 A | 4/1983 | Tomsu | |
| 4,395,677 A | 7/1983 | Petersdorf | |
| 4,484,119 A | 11/1984 | Kerr | |
| 4,497,201 A | 2/1985 | Allen et al. | |
| 4,609,905 A | 9/1986 | Uzzo | |
| 4,648,662 A | 3/1987 | Fennel et al. | |
| 4,785,295 A | 11/1988 | Fukui et al. | |
| 4,839,811 A | 6/1989 | Kanegae et al. | |
| 4,886,291 A | 12/1989 | Okamoto | |
| 4,892,101 A | 1/1990 | Cheung et al. | |
| 4,934,474 A | 6/1990 | Sugasawa | |
| 4,953,652 A | 9/1990 | Ohmura et al. | |
| 4,961,144 A | 10/1990 | Yabe et al. | |
| 4,975,897 A | 12/1990 | Tanahashi | |
| 4,996,657 A | 2/1991 | Shiraishi et al. | |
| 5,008,823 A | 4/1991 | Takahashi | |
| 5,014,801 A | 5/1991 | Hirose | |
| 5,181,011 A | 1/1993 | Okano | |
| 5,186,153 A | 2/1993 | Steinbrenner et al. | |
| 5,190,522 A | 3/1993 | Wokcicki et al. | |
| 5,200,911 A | 4/1993 | Ishikawa et al. | |
| 5,201,380 A | 4/1993 | Callahan | |
| 5,271,475 A | 12/1993 | Takeshita | |
| 5,282,135 A | 1/1994 | Sato et al. | |
| 5,283,740 A | 2/1994 | Sato et al. | |
| 5,305,723 A * | 4/1994 | Kadota | 123/479 |
| 5,357,141 A * | 10/1994 | Nitschke et al. | 307/10.1 |
| 5,448,480 A | 9/1995 | Rauner et al. | |
| 5,457,632 A | 10/1995 | Tagawa et al. | |
| 5,473,147 A | 12/1995 | Hoshino et al. | |
| 5,481,906 A | 1/1996 | Nagayoshi et al. | |
| 5,532,476 A | 7/1996 | Mikan | |
| 5,544,073 A | 8/1996 | Piety et al. | |
| 5,564,429 A | 10/1996 | Bornn et al. | |
| 5,572,670 A * | 11/1996 | Puckett | 714/46 |
| 5,594,228 A | 1/1997 | Swartz et al. | |
| 5,636,121 A | 6/1997 | Tsuyama et al. | |
| 5,642,180 A | 6/1997 | Yoshida | |
| 5,671,981 A | 9/1997 | Sasaki et al. | |
| 5,696,690 A | 12/1997 | Richardson et al. | |
| 5,707,117 A | 1/1998 | Hu et al. | |
| 5,710,704 A | 1/1998 | Graber | |
| 5,712,784 A | 1/1998 | Fendt et al. | |
| 5,748,483 A | 5/1998 | Richardson et al. | |
| 5,752,208 A | 5/1998 | Lerner | |
| 5,899,948 A | 5/1999 | Raphael et al. | |
| 5,928,110 A | 7/1999 | Vornehm et al. | |
| 5,959,529 A | 9/1999 | Kail, IV | |
| 6,035,693 A * | 3/2000 | Horiuchi | 73/1.37 |
| 6,122,577 A | 9/2000 | Mergenthaler et al. | |
| 6,134,491 A | 10/2000 | Kawagoe et al. | |
| 6,144,904 A | 11/2000 | Tseng | |
| 6,198,988 B1 | 3/2001 | Tseng | |
| 6,212,465 B1 | 4/2001 | Sielagoski et al. | |
| 6,225,901 B1 | 5/2001 | Kail, IV | |
| 6,292,733 B1 | 9/2001 | Sugiyama et al. | |
| 6,301,536 B1 | 10/2001 | Vaessen et al. | |
| 6,305,760 B1 | 10/2001 | Otake | |
| 6,354,607 B1 | 3/2002 | Kawashima et al. | |
| 6,408,229 B1 | 6/2002 | Loudon et al. | |
| 6,427,102 B1 | 7/2002 | Ding | |
| 6,491,357 B2 * | 12/2002 | Holst | 303/122.03 |
| 6,502,025 B1 | 12/2002 | Kempen | |
| 6,519,515 B1 | 2/2003 | Baumann et al. | |
| 6,577,948 B1 | 6/2003 | Skellenger et al. | |
| 6,682,153 B2 | 1/2004 | Okai | |
| 6,834,221 B2 | 12/2004 | Jäger et al. | |
| 7,057,503 B2 | 6/2006 | Watson | |
| 7,058,490 B2 | 6/2006 | Kim | |
| 7,085,642 B2 * | 8/2006 | Samuel et al. | 701/82 |
| 7,191,041 B2 | 3/2007 | von Schwertfuehrer et al. | |
| 7,200,524 B2 * | 4/2007 | Kang et al. | 702/183 |
| 7,286,083 B2 * | 10/2007 | Xie et al. | 342/357.58 |
| 7,823,986 B2 | 11/2010 | Ruffer et al. | |
| 7,920,981 B2 | 4/2011 | Fennel et al. | |
| 8,155,823 B2 | 4/2012 | Itoh | |
| 8,159,945 B2 * | 4/2012 | Muro et al. | 370/232 |
| 8,260,516 B2 | 9/2012 | Bechtler et al. | |
| 2001/0044688 A1 | 11/2001 | Okita et al. | |
| 2001/0051845 A1 | 12/2001 | Itoh | |
| 2002/0075137 A1 | 6/2002 | Hofbeck et al. | |
| 2002/0101115 A1 | 8/2002 | Holst | |
| 2002/0113587 A1 * | 8/2002 | Kim | 324/210 |
| 2002/0189889 A1 | 12/2002 | Demerly | |
| 2003/0109939 A1 * | 6/2003 | Burgdorf et al. | 700/38 |
| 2003/0149540 A1 | 8/2003 | Kachel et al. | |
| 2004/0026148 A1 | 2/2004 | Matsuno | |
| 2004/0030474 A1 | 2/2004 | Samuel et al. | |
| 2004/0243287 A1 | 12/2004 | Yanaka et al. | |
| 2005/0131602 A1 | 6/2005 | Souda | |
| 2005/0228546 A1 | 10/2005 | Naik et al. | |
| 2006/0173584 A1 | 8/2006 | Einig et al. | |
| 2006/0181066 A1 | 8/2006 | Andres et al. | |
| 2007/0129871 A1 | 6/2007 | Post, II et al. | |
| 2007/0250183 A1 * | 10/2007 | Howell et al. | 700/20 |
| 2007/0282558 A1 | 12/2007 | Sagisaka | |
| 2008/0097671 A1 | 4/2008 | Kojo et al. | |
| 2008/0176122 A1 | 7/2008 | Wake et al. | |
| 2008/0183350 A1 | 7/2008 | Noguchi | |
| 2008/0195275 A1 | 8/2008 | Kojo et al. | |
| 2009/0055033 A1 | 2/2009 | Gansler et al. | |
| 2009/0069978 A1 | 3/2009 | Inage | |
| 2009/0164059 A1 | 6/2009 | Takeda | |
| 2010/0014302 A1 | 1/2010 | Okumura et al. | |
| 2010/0138105 A1 | 6/2010 | Shibasaki et al. | |
| 2010/0269500 A1 | 10/2010 | Ruffer et al. | |
| 2010/0274436 A1 | 10/2010 | Kodaka et al. | |
| 2011/0066319 A1 | 3/2011 | Bechtler et al. | |
| 2011/0066320 A1 | 3/2011 | Bechtler et al. | |
| 2011/0068913 A1 | 3/2011 | Bechtler et al. | |
| 2011/0071723 A1 | 3/2011 | Bechtler et al. | |
| 2011/0071726 A1 | 3/2011 | Bechtler et al. | |
| 2011/0071727 A1 | 3/2011 | Bechtler et al. | |

OTHER PUBLICATIONS

Office Action from the United States Patent and Trademark Office for U.S. Appl. No. 12/860,362 dated Jul. 19, 2012 (23 pages).
Office Action from the United States Patent and Trademark Office for U.S. Appl. No. 12/860,370 dated Jul. 5, 2012 (21 pages).
Office Action from the United States Patent and Trademark Office for U.S. Appl. No. 12/860,376 dated Aug. 3, 2012 (24 pages).
Notice of Allowance from the United States Patent and Trademark Office for U.S. Appl. No. 12/860,389 dated May 15, 2012 (8 pages).
Office Action from the United States Patent and Trademark Office for U.S. Appl. No. 12/860,407 dated Sep. 14, 2012 (18 pages).
Search Report from the European Patent Office for Application No. 10173776 dated Apr. 4, 2012 (6 pages).
Notice of Allowance from the United States Patent and Trademark Office for U.S. Appl. No. 12/860,376 dated Dec. 17, 2012 (11 pages).
Notice of Allowance from the United States Patent and Trademark Office for U.S. Appl. No. 12/860,362 dated Feb. 21, 2013 (11 pages).
Final Rejection from the United States Patent and Trademark Office for U.S. Appl. No. 12/860,370 dated Dec. 31, 2012 (22 pages).
Office Action from the United States Patent and Trademark Office for U.S. Appl. No. 12/860,396 dated Mar. 6, 2013 (16 pages).
Final Rejection from the United States Patent and Trademark Office for U.S. Appl. No. 12/860,407 dated Feb. 21, 2013 (28 pages).

* cited by examiner

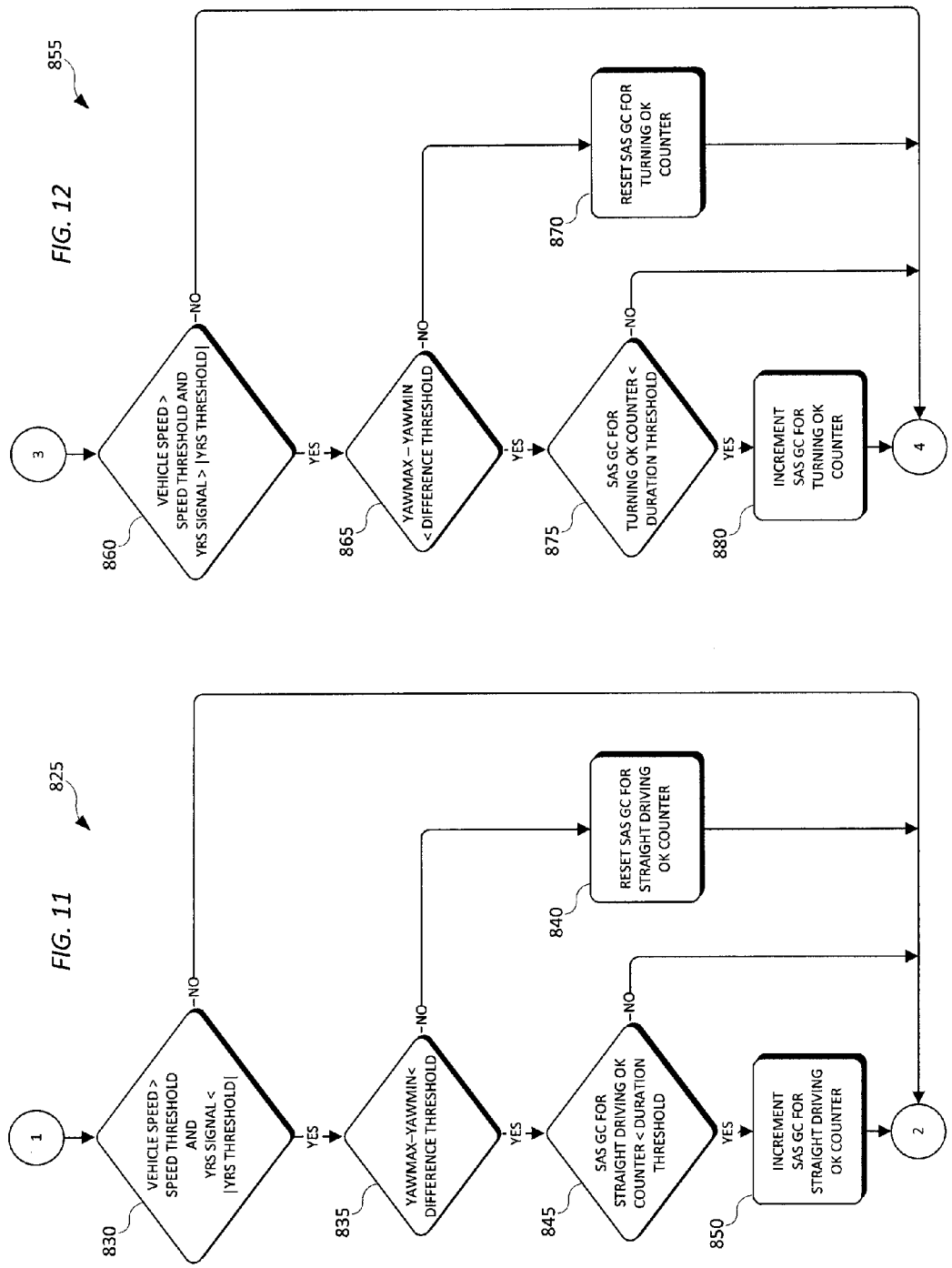

GOOD CHECKING FOR VEHICLE YAW RATE SENSOR

RELATED APPLICATION

The present application claims the benefit of prior filed U.S. Provisional Patent Application No. 61/236,412 filed on Aug. 24, 2009, the entire content of which is hereby incorporated by reference.

This application is related to the following: U.S. patent application Ser. No. 12/860,362, filed on Aug. 20, 2010 entitled GOOD CHECKING FOR VEHICLE WHEEL SPEED SENSORS; and U.S. patent application Ser. No. 12/860,370, filed on Aug. 20, 2010 and entitled GOOD CHECKING FOR VEHICLE LONGITUDINAL ACCELERATION SENSOR; and U.S. patent application Ser. No. 12/860,376, filed on Aug. 20, 2010 and entitled GOOD CHECKING FOR VEHICLE LATERAL ACCELERATION SENSOR; and U.S. patent application Ser. No. 12/860,389, filed on Aug. 20, 2010 and entitled GOOD CHECKING FOR VEHICLE BRAKE LIGHT SWITCH; and U.S. patent application Ser. No. 12/860,396, filed on Aug. 20, 2010 and entitled GOOD CHECKING FOR VEHICLE PRESSURE SENSOR; and U.S. patent application Ser. No. 12/860,407, filed on Aug. 20, 2010 and entitled GOOD CHECKING FOR VEHICLE STEERING ANGLE SENSOR.

BACKGROUND

The present invention relates to a system and method for determining whether a previously-detected vehicle sensor malfunction still exists.

Modern vehicles include a variety of sensors for sensing the operating conditions of a vehicle. Such sensors include wheel speed sensors, steering angle sensors, yaw rate sensors, lateral acceleration sensors, longitudinal acceleration sensors, brake light sensors, etc. Each of the sensors is connected to a vehicle control system, such as an electronic stability control ("ESC") system, or one or more electronic control units ("ECUs") within the vehicle. The ESC or the ECUs include combinations of hardware and software which determine the operating conditions of the vehicle and compensate or control the vehicle's motion accordingly. However, the sensors and, subsequently, the signals received from the sensors, are susceptible to malfunctions and/or signal corruption. The ECUs are able to detect when a sensor malfunction has occurred or if the signals received from the sensors are abnormal (i.e., outside of an expected range of values). In such situations, the sensor or sensors (or information therefrom) are disregarded or not used by the vehicle control system when controlling the vehicle. When a sensor fault or malfunction is detected, one or more indicators or tell-tales, such as a check engine light, are also activated or illuminated to indicate to a vehicle operator that a malfunction has occurred.

SUMMARY

Embodiments of the invention relate to systems and methods for determining if a sensor fault or malfunction is persistent, or if the fault or malfunction no longer exists. Conventionally, when a sensor malfunction is detected, a vehicle control system ignores the signals received from the sensor or shuts down the affected vehicle subsystem until the vehicle and/or the sensors are serviced or replaced. However, based on vehicle and driving conditions, it is possible to diagnose whether a sensor malfunction is still present. One particular embodiment of the invention relates to a yaw rate sensor ("YRS"). A variety of possible YRS faults or malfunctions are able to render the signals received from the YRS incorrect or unreliable. For example, the signals from the YRS sometimes include implausible offsets, incorrect signs (e.g., a negative value instead of a positive value), signal rate errors, or implausible outputs with respect to other vehicle sensors, such as a steering angle sensor ("SAS"). In order to monitor such malfunctions, a plurality of good check functions are used to determine whether the malfunction(s) detected in the YRS signals still exist. If the malfunctions are no longer detected in the YRS signals, the vehicle control system returns to a first operational state or normal operational state with respect to the YRS. In the first operational state, the signals from the YRS are used to compensate or control the vehicle's motion. If the malfunction continues to be detected, the vehicle control system operates in a second operational state or malfunction state with respect to the YRS. In the second operational state, the signals from the YRS are not used to compensate or control the vehicle.

A check of the sensor signal based on a re-detection by the failure monitoring function can be used as a mechanism to determine if a sensor has returned to normal operation. However, "good checking" is more than this. In general, malfunction monitoring functions are designed to avoid misdetection. On the other hand, "good check" functions are, in general, designed to avoid a false good check, i.e., a good check function has smaller tolerances for deviations and fewer conditions on the driving situation to perform the evaluation. Or, in other words, the tolerances and conditions used in good checking are different than those used to detect a malfunction.

In one embodiment, the invention provides a controller for determining whether a previously-detected, vehicle-sensor malfunction still exists. The controller includes an electronic, non-volatile memory and an electronic processing unit connected to the memory. The electronic processing unit includes a malfunction monitoring module that monitors the operation of a YRS and generates a first fault signal when the YRS malfunctions. The first fault signal contains first fault information, causes at least one tell-tale indicator to be activated, and causes a vehicle control system to modify its operation from a first operating state to a second operating state. A failure handling module causes the first fault information to be stored in the memory, and a signal checking module retrieves the first fault information from the memory and performs a first signal check on information from the YRS.

In some embodiments, the vehicle control system does not use a signal from the yaw rate sensor to control a vehicle when in the second operating state. The signal checking module sets a flag to indicate to the failure handling module that the yaw rate sensor is no longer malfunctioning. The malfunction monitoring module generates the first fault signal when a yaw rate sensor offset variable exceeds a first predetermined yaw rate sensor offset threshold value.

In some embodiments, the signal checking module determines whether a signal from the yaw rate sensor has an incorrect sign. The signal checking module determines whether the yaw rate sensor is sending a plurality of signals at a rate different than a predetermined signal transmission rate. A signal from the yaw rate sensor is compared to a signal from a steering angle sensor. The vehicle control system modifies its operation from the second operating state back to the first operating state if the yaw rate sensor passes the first signal check.

In another embodiment, the invention provides a method, executed by a controller including an electronic processing unit and an electronic, non-volatile memory, for determining whether a previously-detected, vehicle-sensor malfunction still exists. The method includes the steps of monitoring the operation of at least one YRS with a malfunction monitoring module, generating a fault signal containing fault information with the malfunction monitoring module when the at least one YRS malfunctions, and causing at least one tell-tale indicator to be activated or a vehicle control system to modify its operation from a first operating state to a second operating state. The method also includes storing fault information in the memory with a failure handling module, retrieving the fault information from the memory, and performing a signal check on information from the at least one YRS with a signal checking module. A reset signal is generated by the signal checking module which causes the at least one tell-tale indictor to be deactivated and the vehicle control system to resume operation in the first operating state if the at least one YRS passes the signal check.

In some embodiments, the vehicle control system does not use a signal from the yaw rate sensor to control a vehicle when in the second operating state. A flag is set to indicate to the failure handling module that the yaw rate sensor is no longer malfunctioning.

In some embodiments, the malfunction monitoring module generates the fault signal when a yaw rate sensor offset variable exceeds a first predetermined yaw rate sensor offset threshold value. The controller determines whether a signal from the yaw rate sensor has an incorrect sign. The controller determines whether the yaw rate sensor is sending signals at a rate different than a predetermined signal transmission rate.

In some embodiments, a signal from the yaw rate sensor is compared to a signal from a steering angle sensor. The fault information includes an indication of a type of yaw rate sensor malfunction.

In another embodiment, the invention provides a vehicle that includes a plurality of vehicle sensors which provide a plurality of sensor signals to a vehicle control system. The vehicle control system controls the vehicle based at least in part on the plurality of sensor signals and switches from a first operating state to a second operating state when a malfunction in one or more of the vehicle sensors is detected. The vehicle includes at least one controller connected to the vehicle control system which includes an electronic memory and an electronic processing unit connected to the electronic memory. The electronic processing unit includes a malfunction monitoring module that activates at least one indicator when a YRS malfunction is detected, a failure handling module that stores a first set of fault information in the electronic memory when the YRS malfunction is detected, and a signal checking module that retrieves the set of fault information from the electronic memory and executes a first malfunction checking function to determine if the YRS malfunction is persistent. The vehicle control system modifies its operation from the second operating state to the first operating state when the YRS malfunction is not persistent. When operating in the first state, the vehicle control system uses signals from the YRS to compensate the motion of the vehicle. When operating in the second state, the vehicle control system does not use the signals from the YRS to compensate the motion of the vehicle.

In some embodiments, the vehicle control system is an electronic stability control system. The first set of fault information includes an indication of a type of yaw rate sensor malfunction. The electronic memory is an electronic, non-volatile memory.

Other aspects of the invention will become apparent by consideration of the detailed description and accompanying drawings.

BRIEF DESCRIPTION OF THE DRAWINGS

FIG. 11 is a second SAS GC process according to an embodiment of the invention.

FIG. 12 is a third SAS GC process according to an embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to good check functions for a vehicle control system, such as an electronic stability control ("ESC") system. The good check functions are used to determine whether a malfunction previously detected in the signals received from a vehicle sensor still exists. If the malfunction is no longer detected in the sensor signals, the ESC system returns to a first operational state or normal operational state. In the first operational state, the signals from the sensor are used to compensate or control the vehicle's motion. If the malfunction continues to be detected, the ESC system operates in a second operational state or malfunction state. In the second operational state, the signals from the malfunctioning sensor are not used to compensate or control the vehicle.

Figure 1:
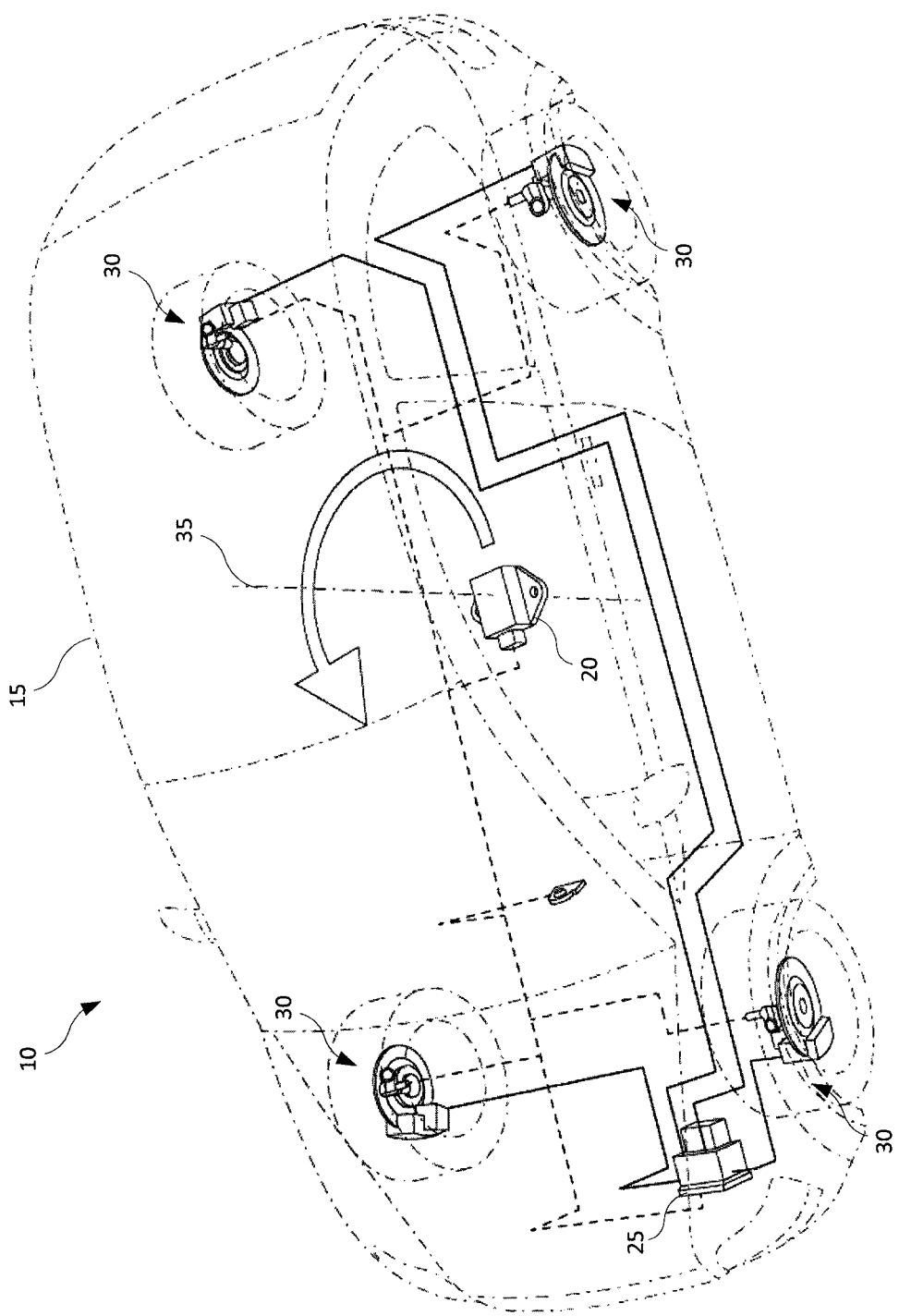
FIG. 1 illustrates a vehicle that includes, among other things, an electronic control unit ("ECU") and a yaw rate sensor ("YRS").

FIG. 1 illustrates a control system 10 for a vehicle 15 that includes at least one vehicle sensor 20, an electronic control unit ("ECU") 25, and one or more actuation devices or systems 30, such as brakes and hydraulic brake lines, for controlling the motion of the vehicle 15 based on signals received from the at least one vehicle sensor 20. In the illustrated embodiment, the at least one vehicle sensor 20 is a yaw rate sensor ("YRS"), which measures the rotational motion of the vehicle with respect to a vertical axis 35 (i.e., an axis perpendicular to a driving surface). In some embodiments, the vehicle 15 includes additional YRSs which measure yaw rates at different locations on the vehicle 15, or the YRSs are configured to sense, in conjunction with each other, a single yaw rate of the vehicle 15. The YRS 20 sends signals to the ECU 25 related to a measured yaw rate of the vehicle 15. The ECU 25 interprets the received signals and generates control signals to compensate the motion of the vehicle 15 accordingly. If a fault or malfunction is detected using the signals received from the YRS 20, the signals from the malfunctioning YRS 20 are not used to compensate the motion of the vehicle 15.

Figure 2:
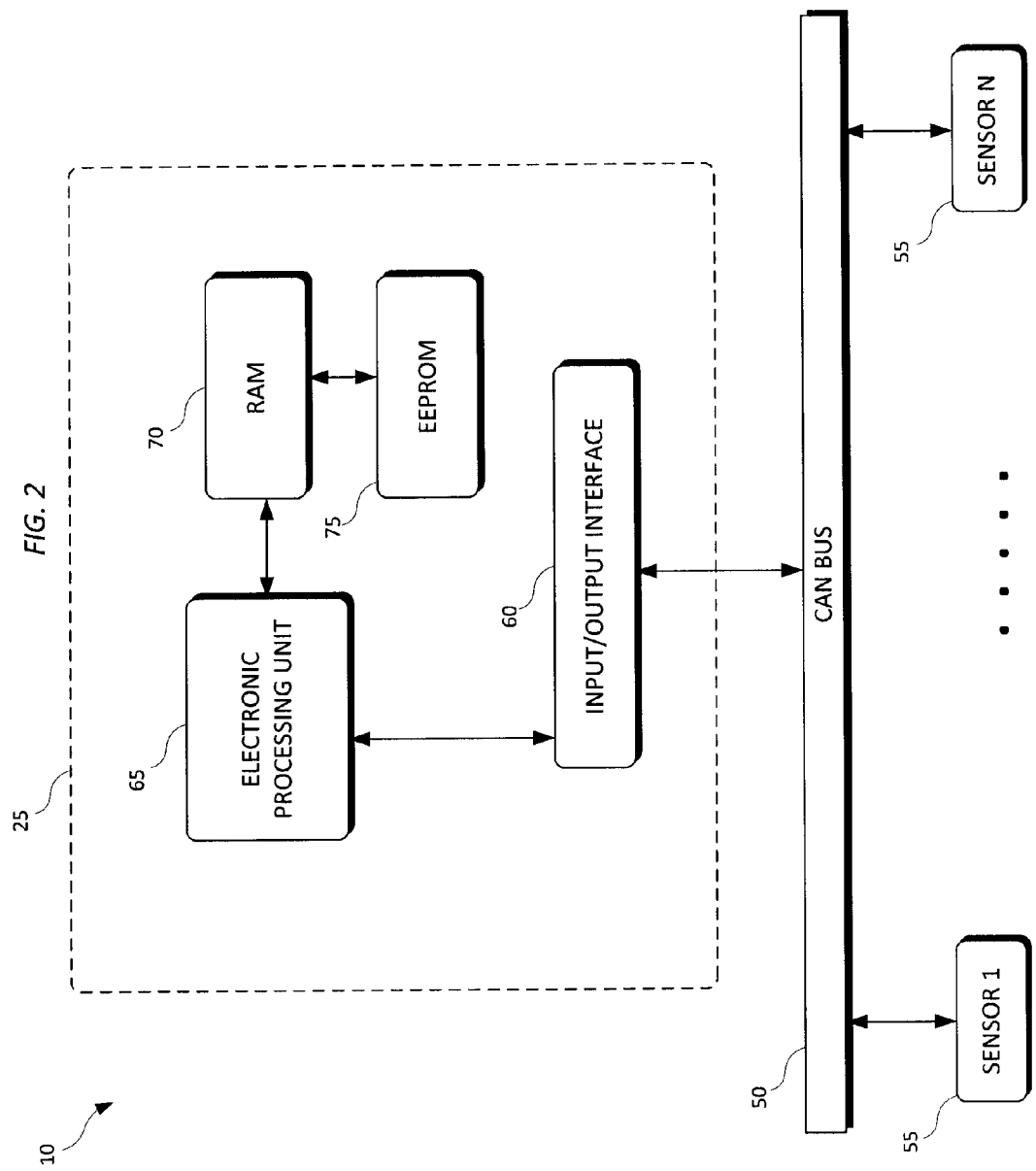
FIG. 2 illustrates a vehicle control system according to an embodiment of the invention.

FIG. 2 schematically illustrates the control system 10 of FIG. 1. The control system 10 includes the ECU 25, a bus 50, and one or more sensors 55. The sensors 55 include, for example, the YRS 20, one or more wheel speed sensors, a steering angle sensor ("SAS"), a pitch sensor, a roll sensor, a longitudinal acceleration system, a lateral acceleration sensor, one or more pressure sensors, a brake light switch, one or more hydraulic brake sensors, and the like.

The ECU 25 includes an input/output interface 60, an electronic processing unit ("EPU") 65, and one or more memory modules, such as a random access memory ("RAM") module 70 and an electronically erasable programmable read-only memory ("EEPROM") module 75. The input/output interface 60 transmits and/or receives information over the bus 50. In some embodiments, the input/output interface 60 transmits and/or receives information directly to and from the sensors 55 rather than over a bus 50.

The EPU 65 receives information from the input/output interface 60 and processes the information by executing one or more applications or functions. The functions are stored in a memory, such as the EEPROM 75. The EPU 65 also stores information (e.g., information received from the bus 50 or information generated as a result of executing instructions) in memory. For example, as described below, the EPU 65 stores drive cycle or fault information in the EEPROM 75.

Figure 3:
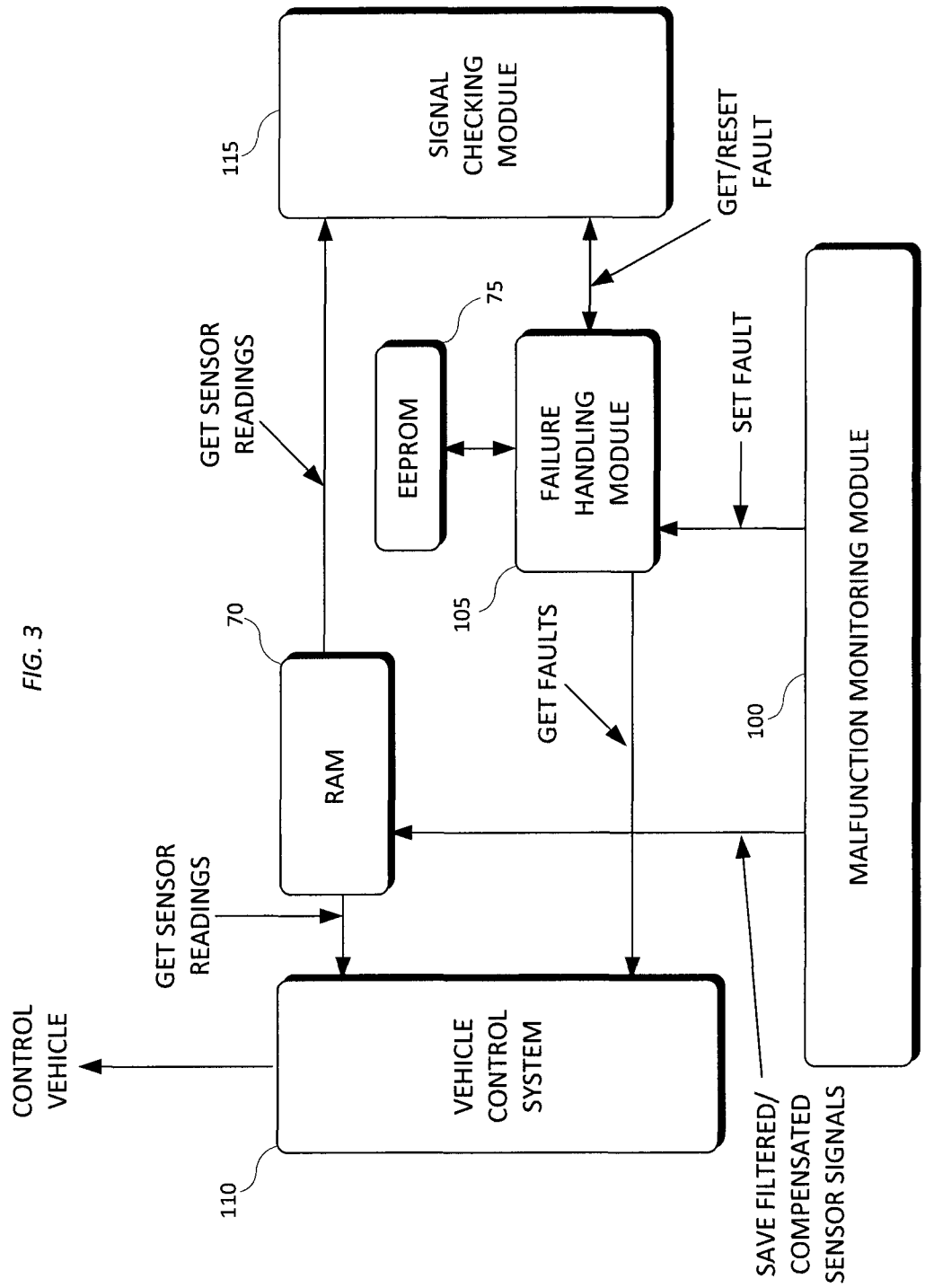
FIG. 3 illustrates an ECU according to an embodiment of the invention.

FIG. 3 illustrates the operation of the applications or functions executed by the EPU 65. The EPU 65 executes one or more functions within a malfunction monitoring module 100, a failure handling module 105, a vehicle control system 110 (such as an electronic stability control ("ESC") program or application), and a signal checking module 115. The malfunction monitoring module 100 receives sensor signals from the sensors 55. In some embodiments, the malfunction monitoring module 100 saves the sensor signals in a memory, such as the RAM 70. In such embodiments, the malfunction monitoring module 100 saves filtered and/or compensated sensor signals rather than raw sensor data. For example, over time, a sensor 55 is susceptible to becoming dirty or damaged during regular operation of the vehicle 15, which has potentially adverse affects on the operation of the sensors 55. To account for these affects, the malfunction monitoring module 100 applies an offset (positive or negative) to the signals received from a particular sensor 55 to compensate for the deterioration and/or damage to the sensor. The malfunction monitoring module 100 then stores the compensated sensor signal to memory. In some embodiments, the malfunction monitoring module 100 also stores additional information in memory, such as sensor offsets, detected faults, and other statistical information related to a particular sensor (e.g., an average sensor reading, a median sensor reading, etc.).

One of the primary functions of the malfunction monitoring module 100 is to determine whether a particular sensor is malfunctioning or faulty. For example, if a sensor offset becomes too large, the malfunction monitoring module 100 determines that the sensor is malfunctioning. As shown in FIG. 3, when the malfunction monitoring module 100 detects a malfunctioning or faulty sensor, the malfunction monitoring module 100 generates a fault signal and sends the fault signal to the failure handling module 105. The fault signal includes fault information based on the particular fault or malfunction detected by the malfunction monitoring module 100. The failure handling module 105 stores the fault information and corresponding counter information (e.g., a checking or drive cycle counter or an ignition cycle counter value) in memory. The fault information indicates what signal check functions should be performed by the signal checking module 115 during the drive cycle to determine whether a detected fault still exists. For example, if the malfunction monitoring module 100 detects that the YRS 20 is malfunctioning, the failure handling module 105 saves fault information to memory which indicates to the signal checking module 115 to check the YRS 20 during the next drive cycle to determine whether the detected YRS fault still exists.

As shown in FIG. 3, the vehicle control system 110 requests the detected faults from the failure handling module 105. The failure handling module 105 retrieves the stored fault information from memory, and sends the fault information to the vehicle control system 110. In other embodiments, the vehicle control system 110 obtains faults detected during the previous drive cycle from the malfunction monitoring module 100, the RAM 70, the bus 50, or other components included in the control system 10.

After obtaining the previously-detected faults, the vehicle control system 110 activates one or more warning indicators or tell-tales in the vehicle 15 (e.g., on the vehicle's dashboard or instrument panel) in response to the detected faults. In some embodiments, the indicators provide information to the vehicle operator related to the one or more faulty sensors. In other embodiments, the indicators provide information related to a vehicle system. For example, if a faulty YRS is detected, the vehicle 15 activates a warning indicator or telltale related to an electronic stability control ("ESC") system, rather than activating a specific warning light related to the YRS 20. As such, the indicator only provides information to the driver regarding the existence of a fault, whereas the vehicle control system 110 includes information related to the specific nature of the fault.

In most but not all instances, the vehicle control system 110 modifies its operation in response to faults detected by the malfunction monitoring module 100, in addition to activating a warning indicator. For example, if a particular sensor is malfunctioning, the vehicle control system 110 changes its operation from a first operating state (e.g., a state in which the particular sensor is used for vehicle control) to a second operating state (e.g., a state in which the particular sensor is not used for vehicle control). In the first or "normal" operating state, the vehicle control system 110 operates as intended or programmed using all of the data received from the sensors 55. In the second operating state, the vehicle control system 110 operates such that information from faulty sensors is ignored, but control is still provided based on information from the remaining, non-malfunctioning sensors. Alternatively, in the second operating state, the vehicle control system 110 is disabled and no vehicle control is provided, or the vehicle control system 110 is operated in a reduced operational state in which only some of its functionality or features are disabled. The functions and features which are disabled during the reduced operational state are selected based on the importance or critical nature of the information provided by the malfunctioning sensor. For example, information from the YRS is critical to vehicle control functions such as stability control, but is less important or less critical to other vehicle control functions, such as traction control. Accordingly, if the YRS malfunction is detected, traction control continues to operate based on information from other sensors, but stability control is disabled. If the vehicle control system 110 modifies its operation or disables one or more features or functions, one or more warning indicators or tell-tales are activated to warn the vehicle operator of the modified operating state.

The signal checking module 115 retrieves fault information stored in memory and performs various signal check or good check ("GC") functions to determine whether a previously-detected sensor malfunction still exists. In some embodiments, the signal checking module 115 is initialized and retrieves the stored fault information at the start of each new ignition cycle. In other embodiments, the signal checking module 115 retrieves stored fault information from the memory at different times (e.g., on a predetermined schedule or at uniform intervals) while the ECU 25 is operating.

Executing a GC function includes testing current readings or information from one or more vehicle sensors. The signal checking module 115 obtains current sensor readings from, for example, the RAM 70, the bus 50, and/or the malfunction monitoring module 100. The current sensor readings include compensated or filtered sensor signals or information, raw sensor information, current sensor offsets, and/or other statistical information about a particular sensor. After the signal checking module 115 has obtained the current sensor readings, the signal checking module 115 compares the information to one or more threshold values or ranges to determine whether a previously-detected fault still exists. Additionally or alternatively, the signal checking module 115 performs a test on a sensor by sending signals to a previously-malfunctioning sensor, monitoring a response from the sensor, and comparing the response to an expected result.

If the signal checking module 115 determines that a previously-detected fault no longer exists, the signal checking module 115 resets the corresponding fault information by generating a reset signal or setting one or more status flags or bits. The failure handling module 105 receives the reset signal or checks the status flags, and updates the fault information accordingly. When the vehicle control system 110 subsequently requests the current faults from the failure handling module 105, the failure handling module 105 indicates to the vehicle control system 110 that the previously-detected fault no longer exists (e.g., by failing to list the fault as one of the current faults or not setting a corresponding fault flag). The vehicle control system 110 evaluates the current faults and, in some embodiments, deactivates a previously-activated warning indicator or tell-tale, and/or switches its operation from one operational state (e.g., the second operating state) to another operational state (e.g., the first operating state).

Alternatively, if the signal checking module 115 determines that the previously-detected fault still exists, the signal checking module 115 does not alter the corresponding fault information, in order to ensure that the stored fault information continues to indicate that the fault exists. As such, the vehicle control system 110 continues to detect the presence of the sensor malfunction and the signal checking module 115 executes a subsequent GC function (e.g., at the start of the next ignition cycle). In other embodiments, the signal checking module 115 generates a subsequent set fault signal to ensure that the fault information remains in the same state as before the signal checking module 115 executed the GC function.

Figure 4:
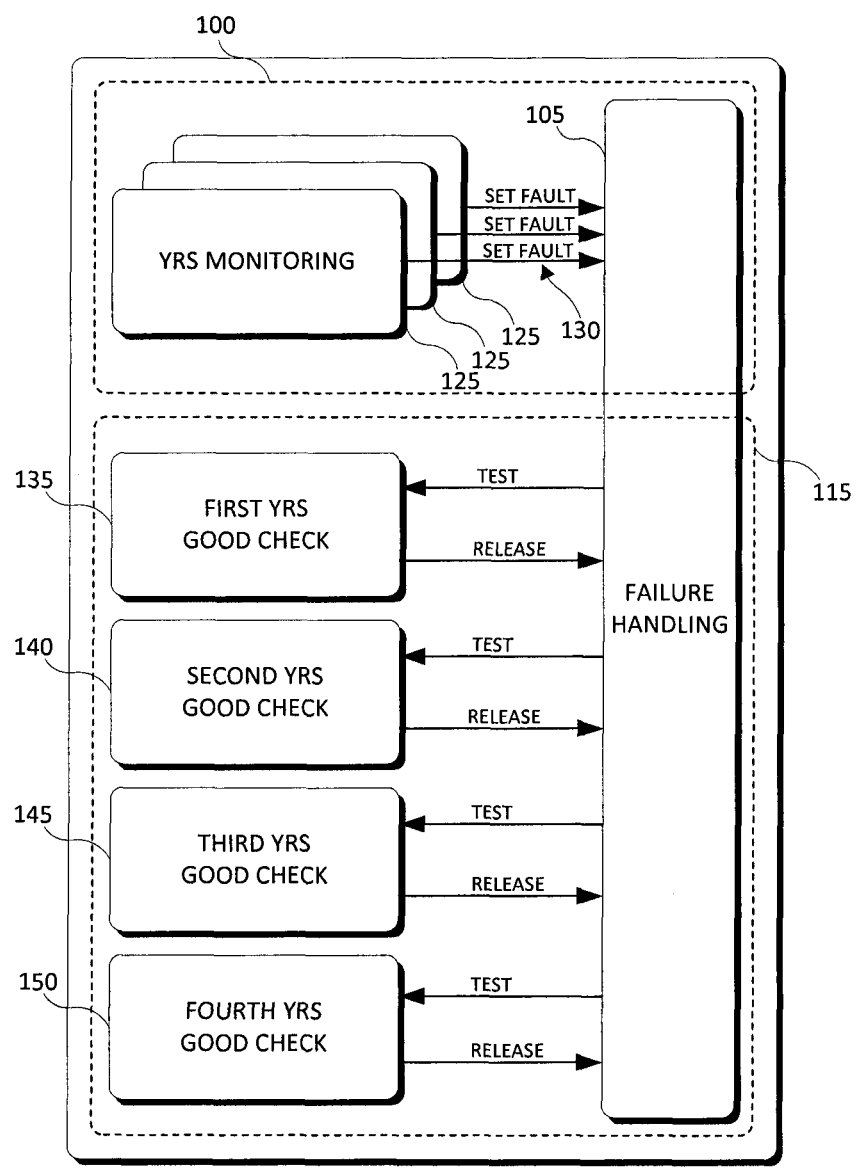
FIG. 4 is a diagram of a sensor malfunction monitoring and handling system according an embodiment of the invention.

The interactions between the signal checking module 115, the malfunction monitoring module 100, and the failure handling module 105 with respect to one or more YRSs are shown in greater detail in FIG. 4. YRS monitoring modules 125 monitor signals received from one or more YRSs (three in the illustrated embodiment) for malfunctions or fault conditions. Alternatively, more or fewer YRSs are monitored by the malfunction monitoring module 100. In some embodiments, the malfunction monitoring module 100 monitors the signals received from the YRSs on a continuous basis, or the YRSs are monitored in a cyclical manner in which the YRSs are monitored in a sequence that includes the monitoring of other sensors or sensor arrays within the control system 10 (e.g., the SAS, the lateral acceleration sensor, etc.).

If the malfunction monitoring module 100 detects one or more malfunctions among the YRSs, one or more YRS drive cycle or fault flags corresponding to the detected malfunction are set in the failure handling module 105. The malfunction monitoring module 100 is configured to detect a variety of YRS malfunctions. For example, the malfunction monitoring module 100 monitors the signals received from the YRS and determines whether the signals include an implausible offset, an incorrect sign, an incorrect signal rate, or an implausible value with respect to an YRS. Expected values or ranges of values for the signals from the YRSs are stored in memory and are adjusted as necessary to compensate for dirt build-up on the YRSs, damage to the YRSs, and the like. It is to be understood that "implausibility" refers to a sensor signal outside of an expected scope and/or existing for a predetermined length of time. Further, not all implausible data is related to a sensor malfunction.

If a YRS malfunction is detected, the failure handling module 105 receives a set fault signal 130 from the malfunction monitoring module 100. The set fault signal 130 sets the drive cycle or fault flag in the failure handling module 105 which, in turn, initiates one or more YRS test functions (e.g., at the start of the next ignition cycle). In the illustrated embodiment, a detected yaw rate sensor malfunction sets any of first, second, third and fourth YRS good check ("GC") fault flags or bits. For example, the fault flags include a YRS common GC fault flag, a YRS wrong-sign GC fault flag, a YRS counter-failure GC fault flag, and a YRS plausibility vs. SAS GC fault flag. Each of the YRS fault flags and associated GC functions are described below. In other embodiments, more or fewer fault flags are set when a YRS malfunction is detected.

Each YRS fault flag has a corresponding GC function and module. For example, the signal checking module 115 includes a first YRS GC module 130, a second YRS GC module 140, a third YRS GC module 145, and a fourth YRS GC module 150. In some embodiments, the first, second, third, and fourth GC modules correspond to a YRS common GC module, a YRS wrong-sign GC module, a YRS counter-failure GC module, and a YRS plausibility vs. SAS GC module. The failure handling module 105 initiates a GC function by sending a test or initiation signal to one or more of the GC modules. In the illustrated embodiment, the GC modules output a release signal which indicates to the failure handling module 105 (and subsequently the vehicle control system 110) that a fault still exists, and that the signals from the YRS 20 should not be used as inputs to control the vehicle 15. In other embodiments, additional signals are sent from the GC functions to the failure handling module 105, such as GC "OK" signals which set corresponding GC "OK" flags.

Each of the GC functions also has associated vehicle status indicators which are selectively activated based on which fault flags are set. For example, when the first YRS GC fault flag is set, a first YRS fault indicator or an ESC failure indicator is activated. The vehicle status indicators are, for example, visual indicators (e.g., lamps), audible indicators, tactile indicators, or combinations thereof.

Figure 5:
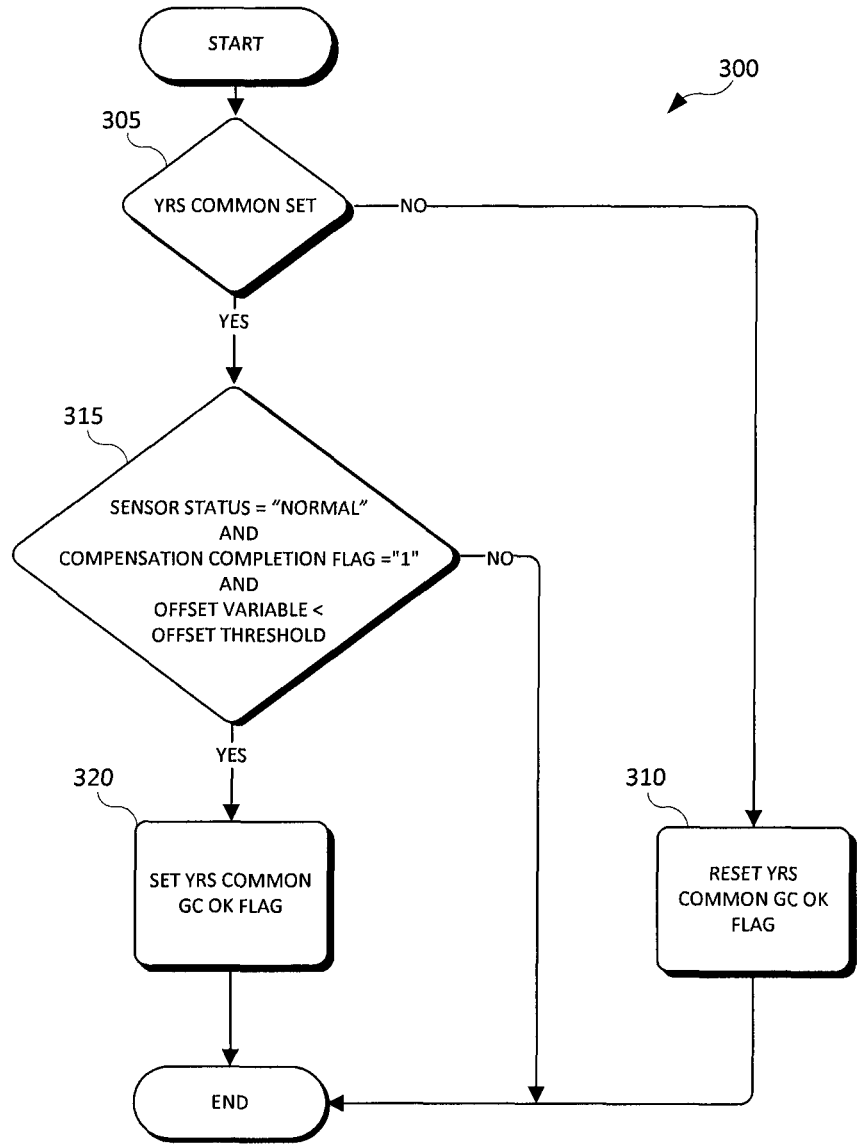
FIG. 5 is a first YRS good check ("GC") process according to an embodiment of the invention.

FIG. 5 illustrates a first YRS GC process or signal checking function 300, such as YRS common GC process, which determines whether a first YRS GC malfunction still exists. As an illustrative example, the YRS common GC fault flag or bit is evaluated to determine whether it has been set (i.e., whether a YRS malfunction was detected during the previous drive cycle) (step 305). If the YRS common GC fault flag is not set, a YRS common GC "OK" flag is reset to indicate that no YRS malfunction is currently being detected (step 310). If the YRS common GC fault flag is set, the first YRS GC function determines whether the malfunction still exists based on, among other things, an offset variable. For example, in addition to the YRS signals sent from the YRS 20 to the ECU 25, the YRS 20 also sends additional information to the ECU 25. In one embodiment, the YRS 20 is able to perform a plurality of self-diagnostic functions related to its own operation. Included in these diagnostic functions, is a determination of whether the YRS is operating in a normal operational mode or an invalid mode, in which the sensor signals received from the YRS 20 are invalid or incorrect (i.e., not representative of the vehicle's yaw rate).

As described above, the operation of vehicle sensors is affected by the vehicle's environment. For example, sensors become dirty or damaged during the normal operation of the vehicle and, as a result, the signals output from the sensors include an offset. The YRS 20 is compensated for such offsets using at least one compensation function. In one embodiment, at the start of each ignition cycle, the ECU 25 checks the output value of the YRS when the vehicle is at a standstill, and compares the YRS output to a sensor-offset threshold value. For example, the sensor-offset threshold value is a predetermined sensor offset value that is used to determine if the YRS 20 is malfunctioning. If the output of the YRS 20 when the vehicle is at a standstill exceeds the sensor-offset threshold value, a corresponding fault flag is set. If the output of the YRS 20 does not exceed the sensor-offset threshold value, the YRS output is compensated for the sensor offset. These threshold values can vary depending on the vehicle in which an embodiment of the invention is implemented. For example, in one embodiment, the sensor-offset threshold value is 5.0 deg/s. If the output of the YRS while the vehicle is at a standstill is 2.0 deg/s, the output of the YRS is compensated by 2.0 deg/s. If a value stored in the malfunction monitoring module 100 (or a memory connected to the malfunction monitoring module 100) has a value of 0.0 deg/s stored as an expected value for the output of the YRS 20, this value is deleted or overwritten with a value of 2.0 deg/s or −2.0 deg/s (depending on the sign of the sensor offset), and a YRS compensation flag or bit is set to '1'.

Under certain conditions, the output of the YRS 20 requires compensation when the vehicle 15 is not at a standstill. For example, although the ignition normally remains on while the vehicle is moving, if the vehicle ignition cycles while the vehicle 15 is moving, a different compensation function is used to compensate the output signals from the YRS 20. Under such conditions, a fast YRS compensation is executed. During a fast YRS compensation, a higher sensor compensation threshold value is used, such as 7.0 deg/s. If the output of the YRS 20 does not exceed the sensor compensation threshold value, the YRS output is compensated for the sensor offset, as described above. If the YRS is compensated using fast compensation, a YRS fast compensation flag is set to '1'. The compensation of the YRS in either a standstill state or a driving state is not described in further detail herein. Compensating the signals from the YRS in the above-described manners, as well as additional or different techniques for compensating the signals from the YRS 20, are know to those skilled in the art.

The first YRS GC function 300 shown in FIG. 5 then determines whether (1) the YRS is operating in a 'NORMAL' mode, (2) whether YRS compensation has been completed (i.e., either the YRS compensation flag or the YRS fast compensation flag is set to '1'), and (3) whether the YRS compensation value or variable is less than the sensor-offset threshold value (step 315). If any of the above conditions are not satisfied, the first YRS GC function ends because the malfunction is still present in the signal from the YRS. The first YRS GC function 300 generates a signal which is sent to the failure handling module 105 indicating that the malfunction persists, and that the signals from the YRS 20 should not be used to control the vehicle 15. Alternatively, by not setting the YRS common GC "OK" flag, the failure handling module 105 determines that the malfunction is still present. If conditions 1-3 are satisfied, the YRS common GC "OK" flag is set (step 320), and the first YRS GC function 300 ends. When the YRS common GC "OK" flag is set, the first YRS GC malfunction is no longer present, and signals from the YRS are used to control the vehicle 15. After the YRS common GC "OK" flag is set, the YRS common fault indicator is reset.

The second YRS GC fault flag or bit or the YRS wrong-sign GC fault flag or bit is set when the malfunction monitoring module 100 determines that the output of the YRS 20 has an incorrect sign (based on information related to the SAS and wheel speed sensors). The ECU 25 determines a model yaw rate based on an output signal of the SAS and output signals of the wheel speed sensors. An ideal or median yaw rate for the model yaw rate is determined based on the output signal of the SAS. A two-sided band around (i.e., a band above and a band below) the ideal yaw rate value provides a range above and below the ideal yaw rate value to which the output of the YRS is compared. The band of yaw rate values is calculated based on the difference in wheel speeds between left and right wheels on the same axle (e.g., a front axle). For example, when a vehicle 15 is turning to the right, a right front wheel turns slower than a left front wheel. As described in greater detail below, the model yaw rate is used to calculate a yaw rate integral when executing the YRS wrong-sign GC function.

As described above, each of the GC functions also has associated vehicle status indicators which are selectively activated based on which fault flags are set. When the YRS wrong-sign GC fault flag is set, a YRS wrong-sign fault indicator or an ESC failure indicator is activated (such as a lamp or other visual indicator, audible indicators, tactile indicators, or combinations thereof).

Figure 6:
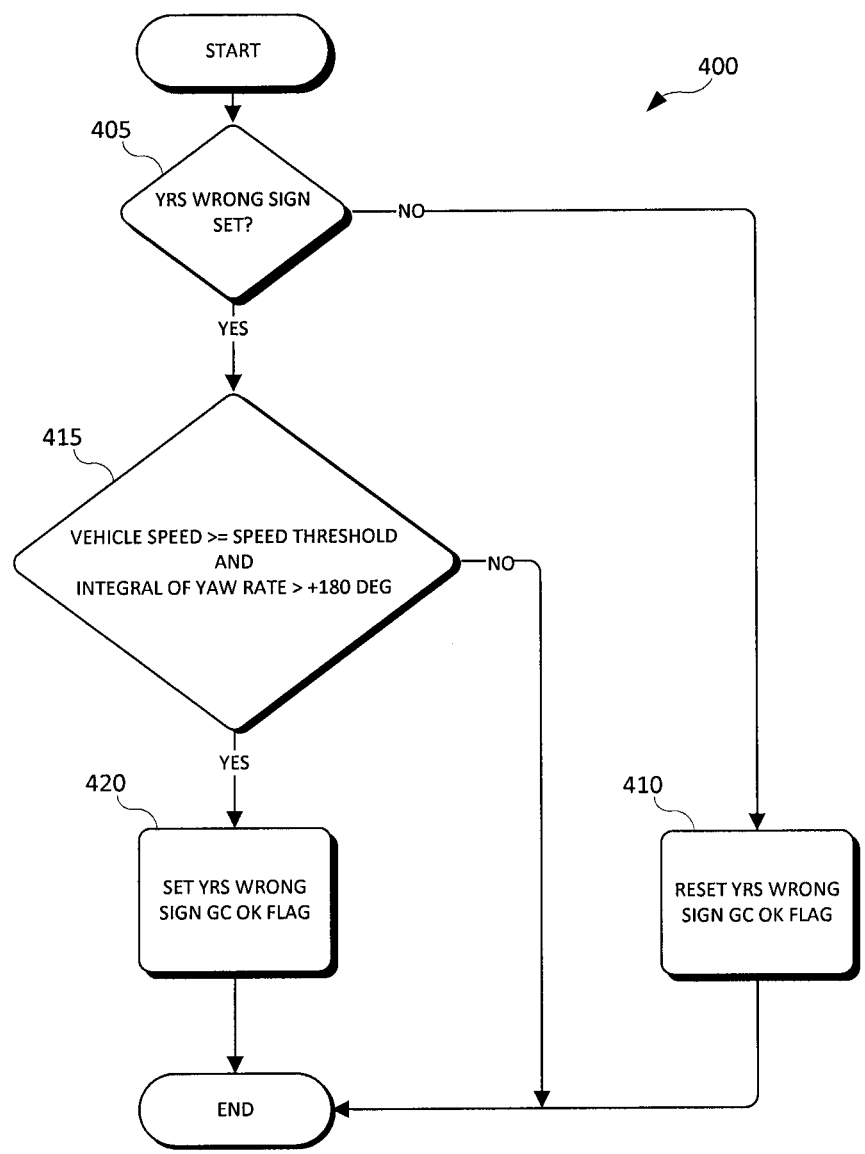
FIG. 6 is a second YRS GC process according to an embodiment of the invention.
Figure 7:
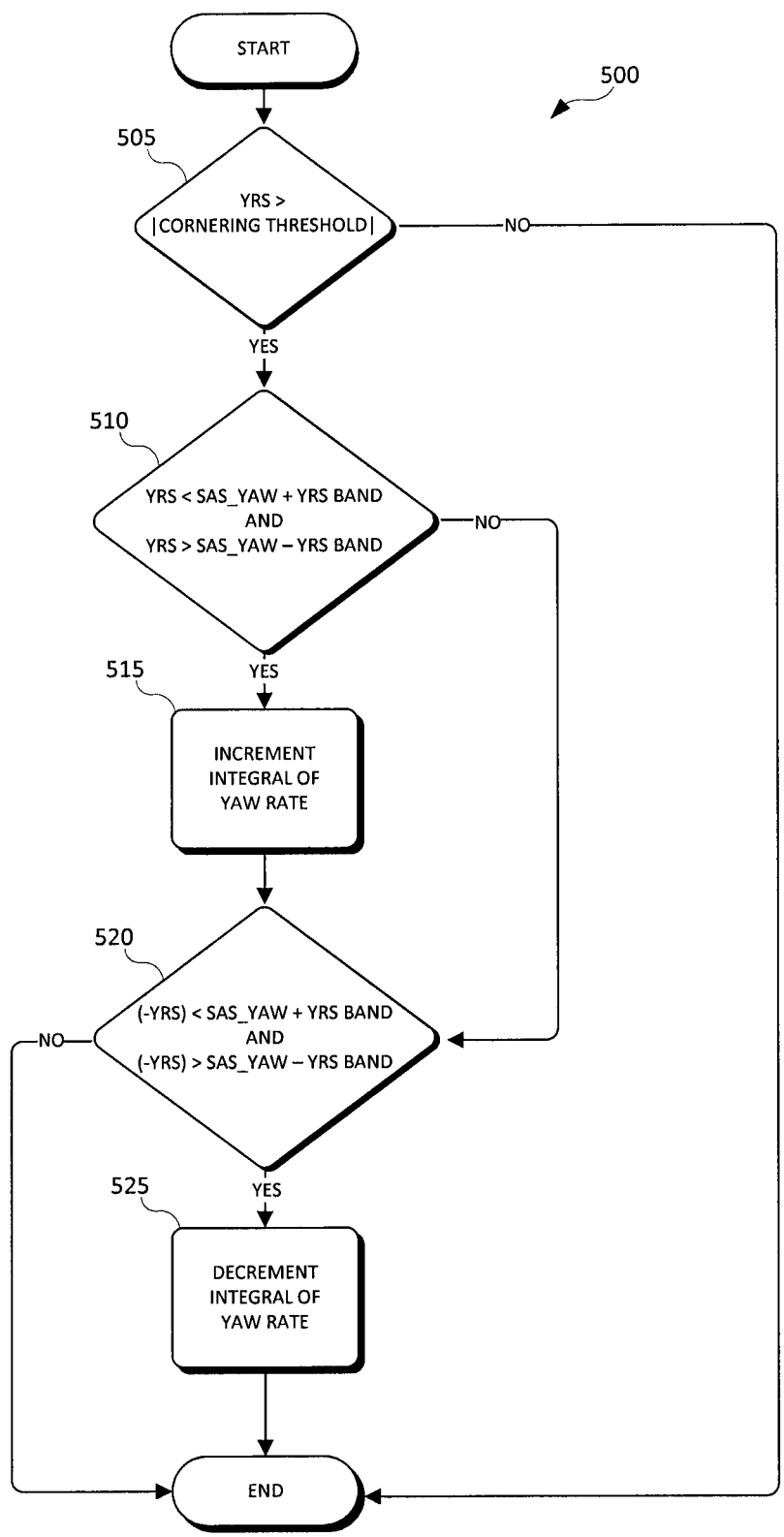
FIG. 7 is a process for determining a YRS integral according to an embodiment of the invention.

FIG. 6 illustrates a second GC process or signal checking function 400 (in this example a YRS wrong-sign GC process). The process 400 determines whether a YRS wrong-sign GC malfunction still exists. When the YRS wrong-sign GC fault flag or bit is set, the second YRS GC function 400 is initiated at the start of the next drive cycle. The YRS wrong-sign fault flag is evaluated to determine whether it has been set (i.e., whether a YRS wrong-sign malfunction was detected during the previous ignition cycle) (step 405). If the YRS wrong-sign GC fault flag is not set, a YRS wrong-sign GC "OK" flag is reset to indicate to the failure handling module that the YRS wrong-sign malfunction is no longer present (step 410). If the YRS wrong-sign GC fault flag is still set, the second YRS GC function determines whether the vehicle speed is greater than or equal to a speed threshold value, such as 72 km/h (or approximately 45 mph), and whether a yaw rate integral is greater than, for example, 180° (step 415) before setting a YRS wrong-sign GC "OK" flag (step 420). The vehicle speed is determined using output signals from, for example, the wheel speed sensors, and the yaw rate integral is calculated as shown in process 500 of FIG. 7. In some embodiments, vehicle speed is compared to a range of threshold values such as 50 km/h-150 km/h.

In process 500, the output of the YRS 20 is compared to the yaw rate model (step 505). In the illustrated embodiment, the yaw rate value based on the SAS is given as SAS_YAW, and the band of yaw rate values is based on the wheel speed sensors. The first step in calculating the yaw rate integral is to determine whether the vehicle is turning. For example, because the yaw rate model is based on a yaw rate value determined from the SAS, if the vehicle is not turning, the yaw rate value from the SAS is zero or close to zero. Additionally, the band of yaw rate values is determined based on signals from the wheel speed sensors, or more particularly, a difference between the signals from two wheel speed sensors on the same axle. Accordingly, if the vehicle is not turning, the difference between the speeds of two wheels is, in most instances, small (e.g., <1.0 deg/s) or negligible. A YRS value determined using the signals from the YRS is compared to the absolute value of a cornering threshold value (e.g., 1.5-4.5 deg/s). In other embodiments, the cornering threshold value is greater than 4.5 deg/s or less than 1.5 deg/s, or is dependent upon the speed of the vehicle 15. If the YRS value is not greater than the cornering threshold value, the process 500 ends, and the yaw rate integral is not calculated (or is not updated). If no yaw rate integral is calculated, a default value for the yaw rate integral of, for example, 0.0 deg is used in the YRS wrong-sign GC function 400 of FIG. 6.

If the YRS value is greater than the cornering threshold value, the YRS value is compared to the yaw rate model described above to determine if the sign of the YRS value is correct. A first comparison is made between the YRS value and the SAS_YAW value +/−a YRS band of values (e.g., +/−2.0 deg/s) (step 510). If (1) the YRS value is less than the SAS_YAW value +2.0 deg/s, and (2) the YRS value is greater than the SAS_YAW value −2.0 deg/s, the yaw rate integral is incremented by predetermined amount, for example, the YRS value multiplied by 0.04 (i.e., YRS*0.04) (step 515). Then, a second set of comparisons is performed (step 520). If either of conditions (1) or (2) is not satisfied, the YRS integral is not incremented and the second set of comparisons is performed (step 520). The second set of comparisons is similar to the first set, but instead of comparing the YRS value to the YRS model, a negation or negative YRS value (i.e., −YRS) is compared. If (1) the (−YRS) value is less than the SAS_YAW value +2.0 deg/s, and (2) the (−YRS) value is greater than the SAS_YAW value −2.0 deg/s, the yaw rate integral is decremented by predetermined amount, for example, the YRS value multiplied by 0.04 (i.e., YRS*0.04) (step 525). If either of conditions (1) or (2) is not satisfied, the yaw rate integral is not decremented.

In general, if the YRS value has the correct sign, the first set of comparisons is satisfied, the yaw rate integral is incremented, and the second set of comparisons is not satisfied. If the YRS value has the wrong sign, the first set of comparisons is not satisfied, the second set of comparisons is satisfied, and the yaw rate integral is decremented. Although generally true, if the yaw rate determined from the SAS is incorrect or invalid (e.g., the SAS is malfunctioning), the yaw rate integral may be decremented even if the sign of the YRS value is correct. Alternatively, the yaw rate integral may be incremented even if the YRS value has an incorrect sign. For the sake of the description of the second YRS GC function, it is assumed that the SAS is functioning properly and that, if the sign of the YRS value is correct, the yaw rate integral is incremented.

In one embodiment, the yaw rate integral is calculated or updated only once each time the second YRS GC function is executed. In some embodiments, the yaw rate integral is calculated and updated a predetermined number of times during a single execution of the second YRS GC function, is calculated or updated for a predetermined period of time during a single execution of the second YRS GC function, or is calculated and updated until the yaw rate integral is greater than +180° or a new ignition cycle is initiated. In other embodiments, the yaw rate integral is calculated and updated whenever the speed of the vehicle is greater than a high-speed threshold (e.g., 72 km/h). In any of the above embodiments, the value of the yaw rate integral is stored in the memory of the ECU 25. For example, if the yaw rate integral is stored in a non-volatile memory such as the EEPROM 75, the value of the yaw rate integral is maintained from one ignition cycle to the next. If the yaw rate integral is stored in a volatile memory such as the RAM 70, the value of the yaw rate integral is reset to zero at the start of each ignition cycle.

Referring once again to FIG. 6, if the speed of the vehicle is greater than the high-speed threshold (e.g., 50-150 km/h) and the yaw rate integral has a value greater than +180°, the YRS wrong-sign GC "OK" flag is set (step 420) to indicate to the failure handing module that the YRS malfunction no longer exists. The fault information, the YRS wrong-sign GC fault flag, and the YRS wrong-sign fault indicator are then reset.

The third or YRS message-counter GC fault flag is set when more or fewer than an expected number of sensor signals are received in a predetermined period of time. When this flag is set, a YRS message-counter fault indicator or an ESC failure indicator is activated. As noted, the indicator could be a visual indicator (e.g., a lamp), an audible indicator, a tactile indicator, or a combination thereof.

In one embodiment, the YRS 20 is expected to send two signals to the ECU 25 in an "expected signal transmission period" (e.g., 10-30 ms). However, if the malfunction monitoring module 100 detects that the YRS 20 sent zero, one, or three or more signals to the ECU 25 during the signal sending period, the YRS 20 is not sending signals at the expected rate, and the YRS message-counter GC fault flag is set. Additionally, if the YRS 20 is sending more signals than expected, a YRS message-counter value-too-large flag is set to indicate that the rate at which signals are being sent from the YRS is too fast. If the YRS 20 is sending fewer signals than expected, a YRS message-counter value-too-small flag is set to indicate that the rate at which signals are being sent from the YRS is too slow.

Figure 8:
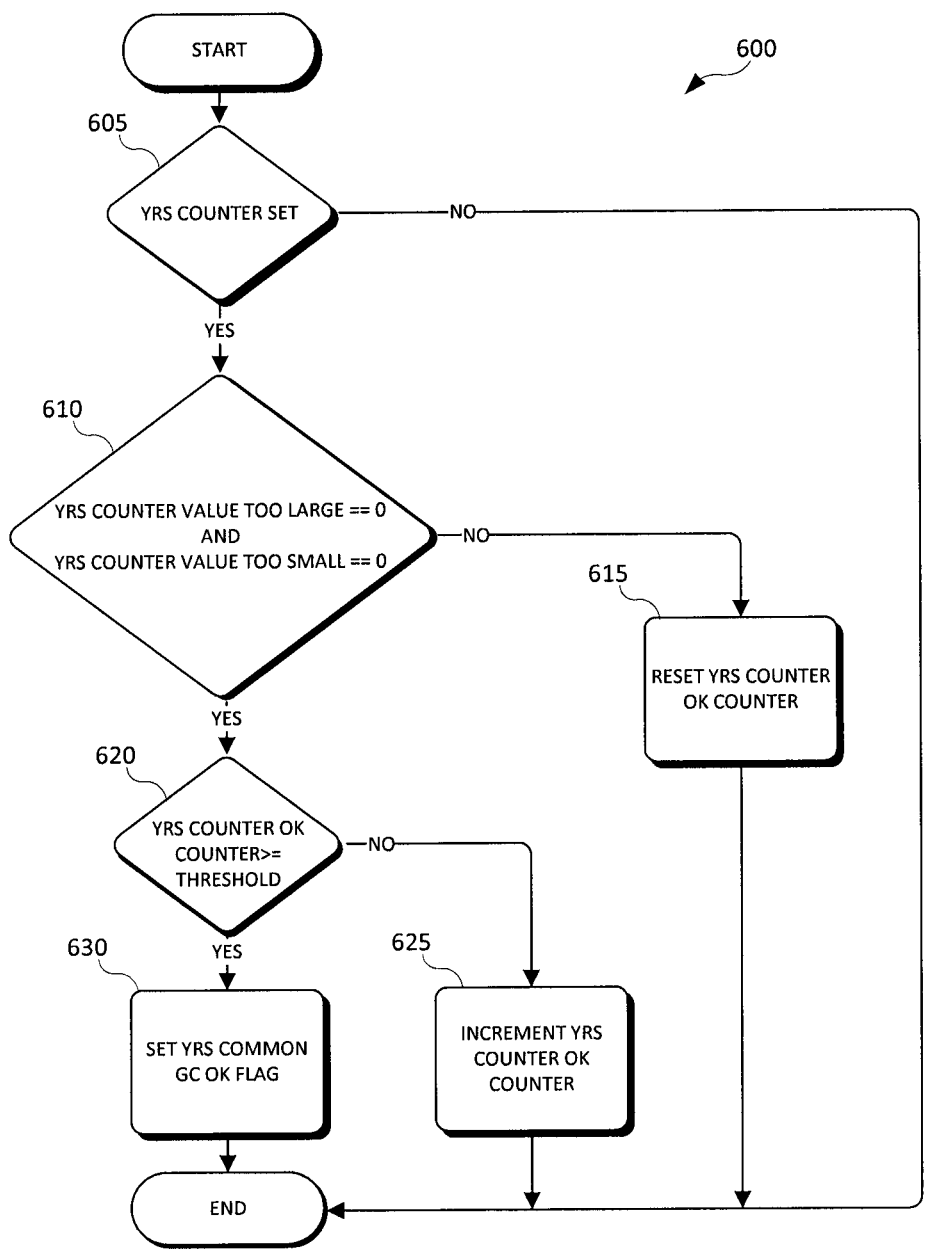
FIG. 8 is a third YRS GC process according to an embodiment of the invention.

A third GC process or signal checking function 600, such as a YRS message-counter GC process, is illustrated in FIG. 8. The process 600 determines whether a YRS message-counter GC malfunction still exists. The third YRS GC function 600 evaluates whether the YRS message-counter GC fault flag has been set (i.e., whether a YRS message-counter malfunction was detected during the previous ignition cycle) (step 605). If the YRS message-counter GC fault flag is not set, the third YRS GC function 600 ends. If the YRS message-counter GC fault flag is set, the third YRS GC function evaluates whether the YRS message-counter value-too-large flag is set, and if the YRS message-counter value-too-small flag is set (step 610). If either of the flags is set (e.g., if either has a value of '1'), a YRS message-counter "OK" counter is reset to zero (step 615) (i.e., the malfunction remains). If neither the value-too-large flag nor the value-too-small flag are set (e.g., each has a value of '0'), the third YRS GC function determines whether a YRS message-counter "OK" counter is greater than or equal to a YRS message-counter GC counter threshold value (e.g., 1.0-5.0 s) (step 620). As shown in step 625, if the YRS message-counter GC counter is less than the threshold value, the YRS message-counter GC counter is incremented. In some embodiments, the YRS message-counter GC counter is incremented in intervals that correspond to the YRS transmission cycle in which the expected number of signals is sent from the YRS 20. In other embodiments, the YRS message-counter "OK" counter is incremented in a different manner, such as with the amount of time the third YRS GC function requires to be executed once, or, for example, once every millisecond while the third YRS GC function 600 is being executed. If the YRS message counter "OK" counter is greater than or equal to the counter threshold, the YRS message-counter GC "OK" flag is set (step 630), and the YRS message-counter fault indicator is reset. Like the other GC functions described the third YRS GC process 600 has associated vehicle status indicators which are selectively activated based on which fault flags are set.

When the YRS plausibility vs. SAS GC fault flag is set, a YRS plausibility vs. SAS fault indicator or an ESC failure indicator is activated. As noted, the indicators are lamps or other indicators, audible indicators, tactile indicators, or combinations thereof.

The YRS plausibility vs. SAS GC fault flag is set when there is a substantial difference between the YRS value and a yaw rate determined from the SAS. In one embodiment, a plausibility threshold is established with a value of, for example, 1.0-4.5 deg/s. The plausibility threshold value is compared to the difference between the YRS value and the value of the yaw rate determined from the SAS. If the difference is greater than the plausibility threshold, the YRS plausibility vs. SAS GC fault flag is set. The plausibility threshold value can vary based on the type of vehicle, driving conditions, vehicle stability conditions, and other factors.

Figure 9:
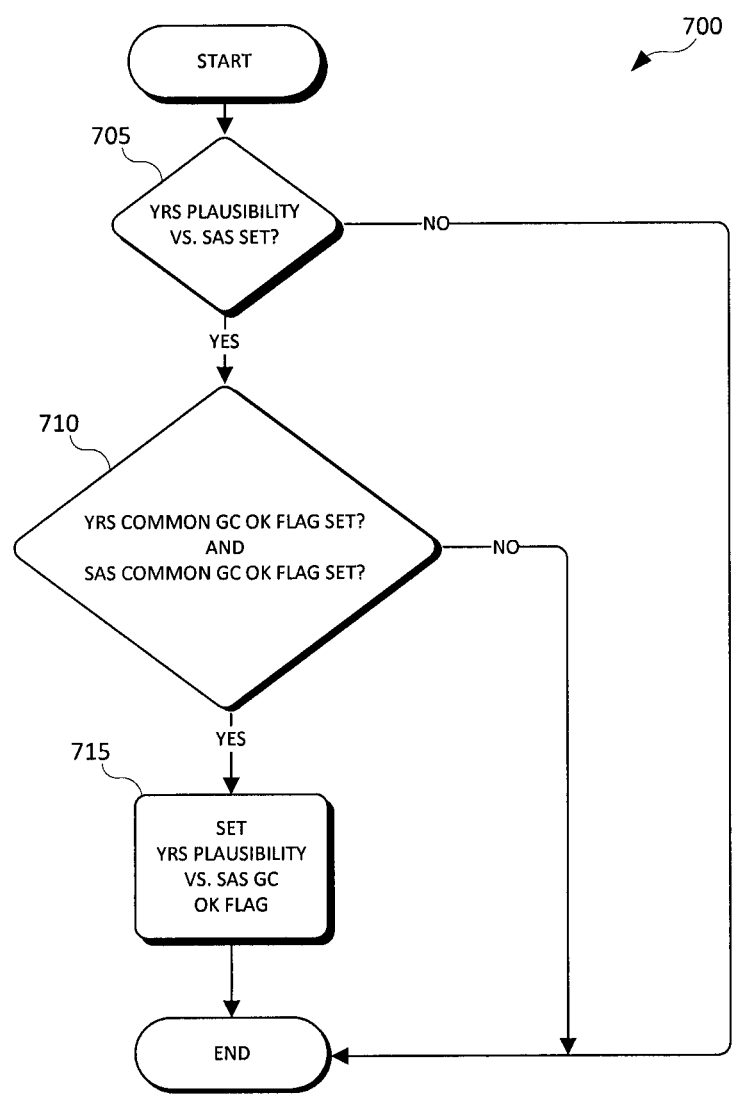
FIG. 9 is a fourth YRS GC process according to an embodiment of the invention.

A fourth GC process 700, such as a YRS plausibility vs. SAS GC process, is illustrated in FIG. 9. The process 700 determines whether a YRS plausibility vs. SAS GC malfunction still exists. The process 700 first determines whether the YRS plausibility vs. SAS fault flag has been set (step 705). If the YRS plausibility vs. SAS GC fault flag is not set, the process 700 ends. If the YRS plausibility vs. SAS fault flag is set, the process 700 determines whether both the YRS common GC "OK" flag and an SAS common GC "OK" flag are set (step 710). If either of the GC "OK" flags is not set, the process 700 ends. If both of the GC "OK" flags are set, the YRS plausibility vs. SAS GC "OK" flag is set (step 715). Then, the process 700 ends.

Figure 10:
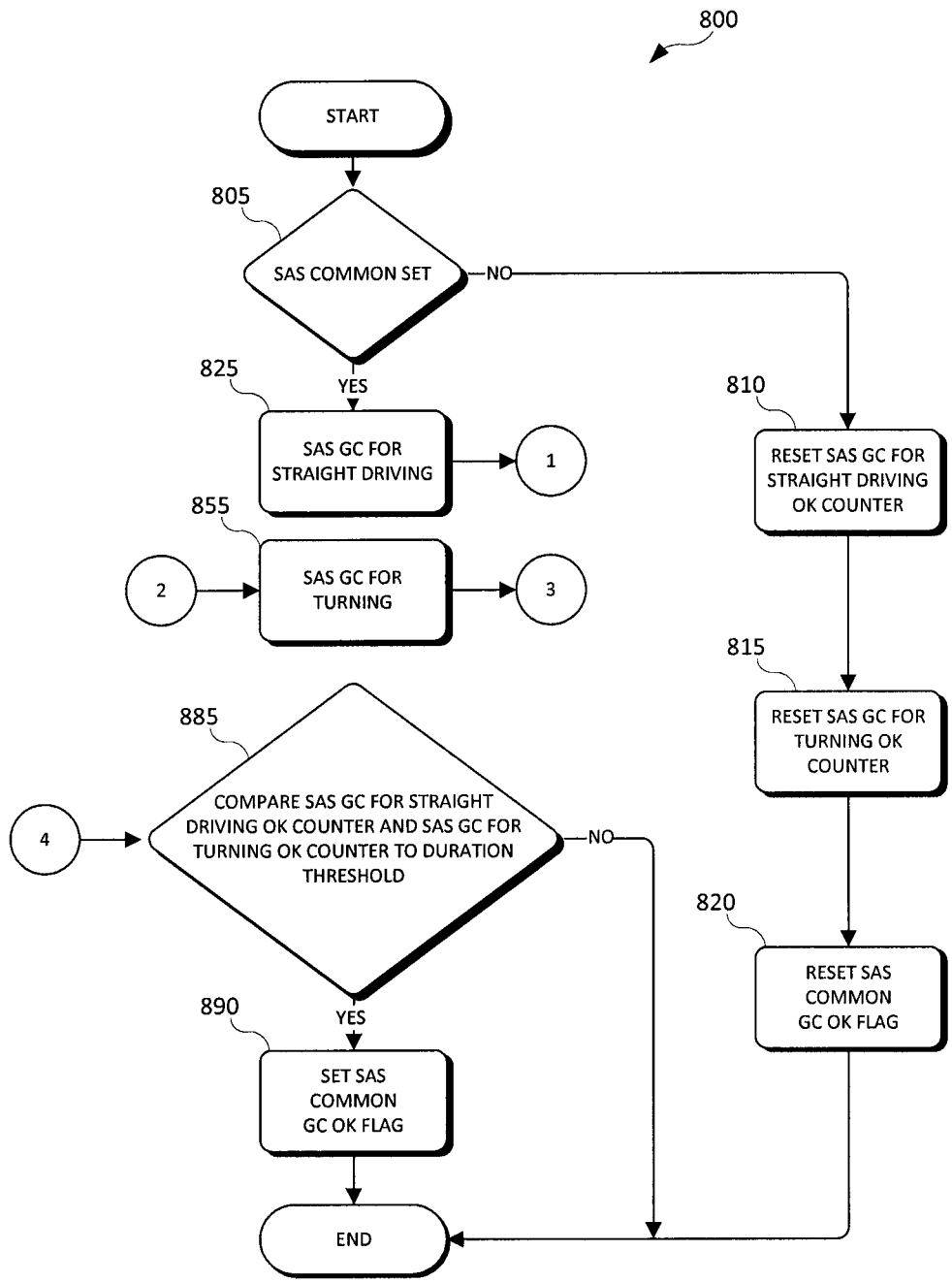
FIG. 10 is a first SAS GC process according to an embodiment of the invention.

The YRS common GC "OK" flag is set as described above with respect to FIG. 5. FIGS. 10-12 illustrate a first SAS GC function 800 for setting the SAS common GC "OK" flag. The signal checking module 115 checks if the SAS common GC fault flag is set (step 805). If the SAS common GC fault flag is not set (i.e., a SAS common fault was not detected during the previous ignition cycle), the signal checking module 115 resets (e.g., sets to a value of zero) an SAS GC for straight driving "OK" counter (step 810), an SAS GC for turning "OK" counter (step 815), and an SAS common GC "OK" flag (step 820), and the first SAS GC function 800 ends.

If, at step 805, the SAS common GC fault flag was set during the previous ignition cycle, the signal checking module 115 determines if the SAS common GC "OK" flag is set. In order to set the SAS common GC "OK" flag, the signal checking module 115 executes a second SAS GC function 825 (e.g., an SAS GC for straight driving function) (see FIG. 11) and a third SAS GC function (e.g., an SAS GC for turning function) (see FIG. 12). Referring to FIG. 11, the signal checking module 115 determines if the speed of the vehicle 15 is above a speed threshold (e.g., 50-150 km/h), and if the YRS value is less than a YRS threshold value (e.g., less than 1.0-5.0 deg/s) (step 830). If the speed of the vehicle 15 does not exceed the speed threshold, or if the YRS value exceeds the yaw rate threshold value, the second SAS GC function 825 ends. If the speed of the vehicle 15 is above the speed threshold, and the YRS value is below the yaw rate threshold value, the signal checking module 115 determines if a difference between maximum and minimum straight driving yaw rates is within a predetermined range (step 835). For example, if the difference between the maximum value of the straight driving yaw rate and the minimum value of the straight driving yaw rate is less than the YRS threshold value, the signal checking module 115 resets an SAS GC for straight driving "OK" counter (step 840), and the second SAS GC function 825 ends.

If the difference between maximum and minimum straight driving yaw rates is less than a difference threshold (e.g., 1.0-5.0 deg/s), the signal checking module 115 determines whether an SAS GC for straight driving "OK" counter is less than a duration threshold (e.g., 100 ms-2.0 s) (step 845). If the SAS GC for straight driving "OK" counter is not less than the duration threshold, the second SAS GC function 825 ends. If the SAS GC for straight driving "OK" counter is less than the duration threshold, the SAS GC for straight driving "OK" counter is incremented (step 850), and the second SAS GC function 825 ends.

The signal checking module 115 then executes the third SAS GC function 855. The signal checking module 115 determines if the vehicle 15 is turning and if the speed of the vehicle 15 is greater than the speed threshold value (e.g., 50-150 km/h) (step 860). In some embodiments, the signal checking module 115 determines whether the vehicle 15 is turning when a yaw rate detected by the YRS 20 is greater than a YRS threshold value (e.g., 3.0-9.0 deg/s). If the speed of the vehicle 15 is not greater than the speed threshold, or the YRS value is not greater than the YRS threshold value, the third SAS GC function 855 ends. If the speed of the vehicle 15 is greater than the speed threshold and the YRS value is greater than the YRS threshold value, the signal checking module 115 determines whether a difference between maximum and minimum turning yaw rates is less than the difference threshold (step 865). If the difference between the maximum and minimum turning yaw rates is not less than YRS threshold, an SAS GC for turning "OK" counter is reset (e.g., set to zero) (step 870). If the difference between the maximum and minimum turning yaw rates is less than the YRS threshold, the signal checking module 115 determines whether the SAS GC for turning "OK" counter is less than the duration threshold (e.g., 100 ms-2.0 s) (step 875). If the SAS GC for turning "OK" counter is not less than the duration threshold, the SAS GC for turning function 855 ends. If the SAS GC for turning "OK" counter is less than the duration threshold, the SAS GC for turning "OK" counter is incremented (step 880), and the SAS GC for turning function 855 ends.

Referring once again to FIG. 10, after executing the third SAS GC function 855, the signal checking module 115 evaluates the SAS GC for straight driving "OK" counter and the SAS GC for turning "OK" counter to determine if the differences between the maximum and minimum yaw rates for straight driving and turning have been within the above-described ranges for at least the duration threshold (step 885). If either of the differences in maximum and minimum yaw rates have not been within the predetermined ranges for the duration threshold, the first SAS GC function 800 ends. However, if both difference between maximum and minimum yaw rates for straight driving and difference between maximum and minimum yaw rates for turning have been within the predetermined ranges for at least the duration threshold, the SAS common GC "OK" flag is set (step 890).

With reference once again to FIG. 9, if both the YRS common GC "OK" flag and the SAS common GC "OK" flag are not set, the fourth YRS GC function 700 ends. If both the YRS common GC "OK" flag and the SAS common GC "OK" flag are set, the signal checking module 115 sets a YRS plausibility vs. SAS GC "OK" flag (step 715), and the fourth YRS GC function 700 ends.

Thus, the invention provides, among other things, a controller for determining whether a previously-detected, vehicle sensor malfunction still exists by executing various signal check functions using signals from one or more vehicle sensors. Various features and advantages of the invention are set forth in the following claims.

What is claimed is:

1. A controller for determining whether a previously-detected, vehicle-sensor malfunction still exists, the controller comprising:
    an electronic, non-volatile memory; and
    an electronic processing unit connected to the electronic, non-volatile memory, the electronic processing unit including,
    a malfunction monitoring module configured to monitor operation of a yaw rate sensor using a first criteria and generate a first fault signal if the yaw rate sensor malfunctions, the first fault signal containing first fault information and causing at least one of an indicator to be activated or a vehicle control system to modify its operation from a first operating state to a second operating state,
    a failure handling module configured to cause the first fault information to be stored in the electronic, non-volatile memory, and
    a signal checking module configured to retrieve the first fault information from the electronic, non-volatile memory and perform a first signal check on information from the yaw rate sensor, the first signal check using a second criteria to determine the yaw rate sensor is functioning properly, the second criteria having smaller tolerances for deviations and fewer conditions on the driving situation to perform the evaluation than the first criteria; and
    wherein the first and second criteria include one or more of an sensor offset, a sensor integral, a vehicle speed, a cornering threshold, a sensor signal rate, a straight driving yaw rate, sensor statistical information, sensor counter information, an implausible value, and a duration.

2. The controller of claim 1, wherein the vehicle control system does not use a signal from the yaw rate sensor to control a vehicle when in the second operating state.

3. The controller of claim 1, wherein the signal checking module sets a flag to indicate to the failure handling module that the yaw rate sensor is no longer malfunctioning.

4. The controller of claim 1, wherein the malfunction monitoring module generates the first fault signal when a yaw rate sensor offset variable exceeds a first predetermined yaw rate sensor offset threshold value.

5. The controller of claim 1, wherein the signal checking module determines whether a signal from the yaw rate sensor has an incorrect sign.

6. The controller of claim 1, wherein the signal checking module determines whether the yaw rate sensor is sending a plurality of signals at a rate different than a predetermined signal transmission rate.

7. The controller of claim 1, wherein a signal from the yaw rate sensor is compared to a signal from a steering angle sensor.

8. The controller of claim 1, wherein the vehicle control system modifies its operation from the second operating state back to the first operating state if the yaw rate sensor passes the first signal check.

9. A method, executed by a controller including an electronic processing unit and an electronic, non-volatile memory, for determining whether a previously-detected, vehicle-sensor malfunction still exists, the method comprising the steps of:
    monitoring operation of at least one yaw rate sensor with a malfunction monitoring module;
    generating, using the malfunction monitoring module, a fault signal containing fault information when the at least one yaw rate sensor malfunctions based on a criteria;
    causing at least one of a warning indicator to be activated or a vehicle control system to modify its operation from a first operating state to a second operating state;
    storing, using a failure handling module, the fault information in the electronic, non-volatile memory;
    retrieving the fault information from the electronic, non-volatile memory;
    executing, in a signal checking module, a signal check function using information from the at least one yaw rate sensor, and using a second criteria to determine the yaw rate sensor is functioning properly, the second criteria having smaller tolerances for deviations and fewer conditions on the driving situation to perform the evaluation than the first criteria; and
    generating a reset signal that causes at least one of the warning indictor to be deactivated or the vehicle control system to resume operation in the first operating state if the at least one yaw rate sensor passes the signal check function; and
    wherein the first and second criteria include one or more of an sensor offset, a sensor integral, a vehicle speed, a cornering threshold, a sensor signal rate, a straight driving yaw rate, sensor statistical information, sensor counter information, an implausible value, and a duration.

10. The method of claim 9, wherein the vehicle control system does not use a signal from the yaw rate sensor to control a vehicle when in the second operating state.

11. The method of claim 9, further comprising setting a flag to indicate to the failure handling module that the yaw rate sensor is no longer malfunctioning.

12. The method of claim 9, wherein the malfunction monitoring module generates the fault signal when a yaw rate sensor offset variable exceeds a first predetermined yaw rate sensor offset threshold value.

13. The method of claim 9, further comprising determining whether a signal from the yaw rate sensor has an incorrect sign.

14. The method of claim 9, further comprising determining whether the yaw rate sensor is sending signals at a rate different than a predetermined signal transmission rate.

15. The method of claim 9, further comprising comparing a signal from the yaw rate sensor to a signal from a steering angle sensor.

16. The method of claim 9, wherein the fault information includes an indication of a type of yaw rate sensor malfunction.

17. A vehicle including a plurality of vehicle sensors providing a plurality of sensor signals to a vehicle control system, the vehicle control system controlling the vehicle based at least in part on the plurality of sensor signals, and switching from a first operating state to a second operating state when a malfunction in one or more of the vehicle sensors is detected, the vehicle including:
    at least one controller connected to the vehicle control system, the controller including an electronic memory; and an electronic processing unit connected to the electronic memory, the electronic processing unit including,
- a malfunction monitoring module that activates at least one indicator when a yaw rate sensor malfunction is detected using a first criteria,
- a failure handling module that stores a first set of fault information in the electronic memory when the yaw rate sensor malfunction is detected, and
- a signal checking module that retrieves the first set of fault information from the electronic memory and executes a first malfunction checking function to determine if the yaw rate sensor malfunction is persistent, the first malfunction checking function using a second criteria to determine the yaw rate sensor is functioning properly, the second criteria having smaller tolerances for deviations and fewer conditions on the driving situation to perform the evaluation than the first criteria;

wherein the vehicle control system modifies its operation from the second operating state to the first operating state when the yaw rate sensor malfunction is not persistent, the vehicle control system using signals from a yaw rate sensor to control the vehicle when operating in the first operating state, and the vehicle control system not using the plurality of sensor signals from the yaw rate sensor to control the vehicle when operating in the second operating state; and wherein the first and second criteria can include one or more of an sensor offset, a sensor integral, a vehicle speed, a cornering threshold, a sensor signal rate, a straight driving yaw rate, and a duration.

18. The vehicle of claim 17, wherein the vehicle control system is an electronic stability control system.

19. The vehicle of claim 17, wherein the first set of fault information includes an indication of a type of yaw rate sensor malfunction.

20. The vehicle of claim 17, wherein the electronic memory is an electronic, non-volatile memory.

* * * * *